United States Patent
Jeon et al.

(10) Patent No.: US 8,764,419 B2
(45) Date of Patent: Jul. 1, 2014

(54) FUEL PUMP MODULE FOR DAMPING VIBRATION

(75) Inventors: Mun-sik Jeon, Cheongju-si (KR);
Chan-heum Yoon, Yeongi-gun (KR);
Hoi-hyun Kim, Yeongi-gun (KR);
Hyoung-il Kim, Daejeon (KR);
Seung-min Lim, Iksan-si (KR)

(73) Assignee: COAVIS (KR)

( * ) Notice: Subject to any disclaimer, the term of this patent is extended or adjusted under 35 U.S.C. 154(b) by 506 days.

(21) Appl. No.: 13/279,672

(22) Filed: Oct. 24, 2011

(65) Prior Publication Data

US 2012/0100016 A1    Apr. 26, 2012

(30) Foreign Application Priority Data

Oct. 25, 2010    (KR) .................. 10-2010-0103776

(51) Int. Cl.
*F04B 35/04*    (2006.01)
*F02M 37/04*    (2006.01)
*F02M 37/10*    (2006.01)
*B60K 15/03*    (2006.01)

(52) U.S. Cl.
CPC .... *F02M 37/103* (2013.01); *B60K 2015/03453* (2013.01); *B60K 2015/03243* (2013.01); *B60K 15/03* (2013.01); *B60K 2015/03236* (2013.01)
USPC ........................................ 417/423.9; 123/497

(58) Field of Classification Search
CPC ....... F04D 13/16; F04D 13/086; F04D 39/16; F02M 37/0076; F02M 37/10; F02M 37/22
USPC ................ 417/423.9; 123/497–509
See application file for complete search history.

(56) References Cited

U.S. PATENT DOCUMENTS

| | | | |
|---|---|---|---|
| 5,511,957 A * | 4/1996 | Tuckey et al. | 417/313 |
| 5,860,796 A * | 1/1999 | Clausen | 417/423.9 |
| 6,123,521 A * | 9/2000 | Mori et al. | 417/423.3 |
| 7,191,767 B2 * | 3/2007 | Schmitt | 123/509 |
| 7,857,143 B2 * | 12/2010 | Oku et al. | 210/416.4 |
| 2009/0101117 A1 * | 4/2009 | Osawa | 123/509 |

* cited by examiner

*Primary Examiner* — Charles Freay
(74) *Attorney, Agent, or Firm* — Cantor Colburn LLP

(57) ABSTRACT

Provided is a fuel pump module for a vehicle in which a fuel pump, which is a vibration body, is physically coupled to an intank filter, a primary filter, and the like, which are other components of the fuel pump module, to have increased mass, such that unique harmonic acceleration of the fuel pump is reduced, a unique vibration area of the fuel pump or the fuel pump module is changed, and harmonic vibration of the fuel pump is thus positioned at the unique vibration area of the fuel pump or the fuel pump module, thereby making it possible to remove noise generated in a fuel tank due to abnormal vibration of the fuel pump module.

3 Claims, 3 Drawing Sheets

FUEL PUMP MODULE FOR DAMPING VIBRATION

CROSS-REFERENCE TO RELATED APPLICATIONS

This application claims priority under 35 U.S.C. §119 to Korean Patent Application No. 10-2010-0103776, filed on Oct. 25, 2010, in the Korean Intellectual Property Office, the disclosure of which is incorporated herein by reference in its entirety.

TECHNICAL FIELD

The present invention relates to a fuel pump module for a vehicle, and more particularly, to a fuel pump module in which a fuel pump, which is a vibration body, is physically coupled to an intank filter, a primary filter, and the like, which are other components of the fuel pump module, to have increased mass, such that unique harmonic acceleration of the fuel pump is reduced, a unique vibration area of the fuel pump or the fuel pump module is changed, and harmonic vibration of the fuel pump is thus positioned at the unique vibration area of the fuel pump or the fuel pump module, thereby making it possible to remove noise generated in a fuel tank due to abnormal vibration of the fuel pump module.

BACKGROUND

A fuel pump, which is a component of a fuel pump module, transports fuel in the fuel tank to an engine when electricity is applied thereto. The fuel pump to which the electricity is applied generates harmonic vibration acceleration at a predetermined period according to revolution per minute (RPM). The harmonic vibration acceleration generally generates noise of the fuel pump module. Particularly, when the harmonic vibration acceleration is positioned at a unique vibration of the fuel pump module or the fuel pump, abnormal vibration and noise are generated.

In the case of the fuel pump module according to the related art, vibration of the fuel pump is damped using a rubber material to prevent the vibration of the fuel pump from being transferred to the fuel pump module, thereby reducing noise.

In the case in which the vibration is damped using the rubber, frequency vibration of the fuel pump is generally damped, such that the noise of the fuel pump is reduced. However, when harmonic vibration acceleration of the fuel pump coincides with a resonant band of the fuel pump module, noise due to abnormal vibration such as resonance is not reduced.

SUMMARY

An embodiment of the present invention is directed to providing a fuel pump module in which a fuel pump of the fuel pump module, which is a vibration body, is physically coupled to an intank filter, a primary filter, and the like, which are other components of the fuel pump module, to have increased mass, such that unique harmonic acceleration of the fuel pump is reduced, a unique vibration area of the fuel pump or the fuel pump module is changed, and harmonic vibration of the fuel pump is thus positioned in the unique vibration area of the fuel pump or the fuel pump module, thereby making it possible to remove noise generated in a fuel tank due to abnormal vibration of the fuel pump module.

Another embodiment of the present invention is directed to providing a fuel pump module in which a second primary filter fixing part is additionally formed in a primary filter assembly to firmly couple the primary filter assembly and an intank filter assembly to each other, such that a clearance between the primary filter assembly and the intank filter assembly is reduced, thereby making it possible to damp vibration of the fuel pump module.

In one general aspect, a fuel pump module for damping vibration includes: a flange having an upper surface exposed to the outside and connected to a fuel tank; a support bar having an upper end connected to a lower end of the flange and extended downwardly; a reservoir connected and fixed to a lower end of the support bar; an intank filter assembly connected to the support bar and installed in the reservoir; a fuel pump embedded in the intank filter assembly; and a primary filter assembly coupled to a lower end of the intank filter assembly and installed in the reservoir, wherein the intank filter assembly includes an intank filter upper housing, an intank filter enclosing the fuel pump and installed in the intank filter upper housing, and an intank filter lower housing having a fuel introduction hole formed at a central portion thereof in order to introduce fuel and an intank filter fixing part formed to be protruded downwardly while being close to the fuel introduction hole and coupled to a lower end of the intank filter upper housing to thereby support the intank filter and the fuel pump, and wherein the primary filter assembly includes a primary filter fixing part body, a first primary filter fixing part protruded upwardly along an edge of the primary filter fixing part body so as to be coupled to the intank filter fixing part while contacting an outer side of the intank filter fixing part, a second primary filter fixing part protruded upwardly from the primary filter fixing part body in a state in which it is spaced apart from the first primary filter fixing part so as to be coupled to the intank filter fixing part while contacting an inner side of the intank filter fixing part, and a primary filter coupled to the primary filter fixing part body.

The intank filter fixing part may include a coupling protrusion formed to be protruded on a circumferential surface thereof, and the first primary filter fixing part may include a coupling groove formed therein, wherein the coupling groove has the coupling protrusion inserted thereinto.

The first primary filter fixing part may include coupling auxiliary grooves formed at both sides of the coupling groove, wherein the coupling auxiliary grooves are spaced apart from the coupling groove and have a linear shape in the vertical direction, and the intank filter fixing part may include guide protrusions formed to be protruded on the circumferential surface thereof, wherein the guide protrusions have a linear shape in the vertical direction and are inserted into the coupling auxiliary grooves.

DETAILED DESCRIPTION OF MAIN ELEMENTS

110: Flange
120: Supply Port
150: Support Bar
210: Reservoir

310: Intank Filter Assembly
311: Intank Filter Upper Housing
313: Intank Filter
315: Intank Filter Lower Housing
410: Fuel Pump
430: Primary Filter Assembly
431: Primary Filter Fixing Part Body
433: First Primary Filter Fixing Part
435: Second Primary Filter Fixing Part
437: Primary Filter

DETAILED DESCRIPTION OF EMBODIMENTS

Hereinafter, exemplary embodiments of the present invention of the present invention will be described in detail with reference to the accompanying drawings.

Figure 1:
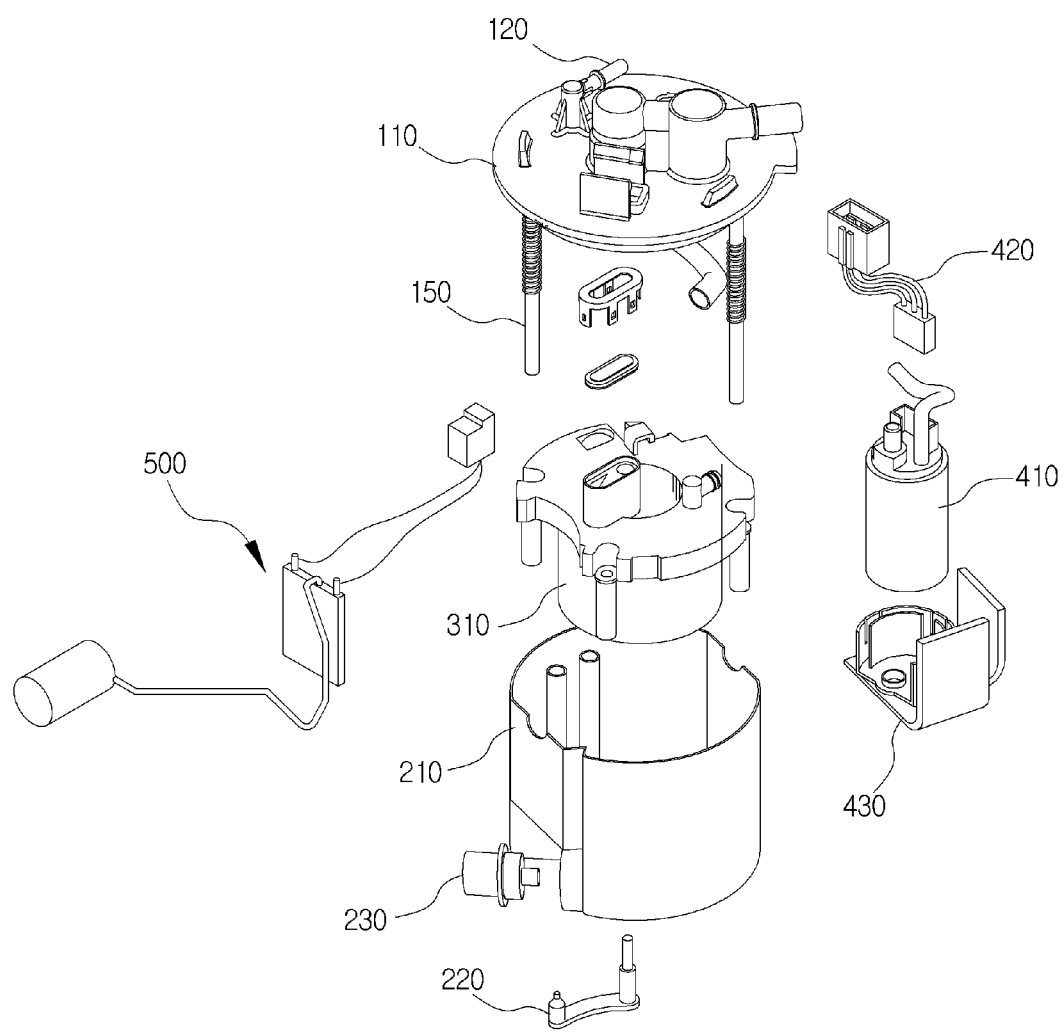
FIG. 1 is an exploded perspective view of a fuel pump module according to an exemplary embodiment of the present invention.
Figure 2:
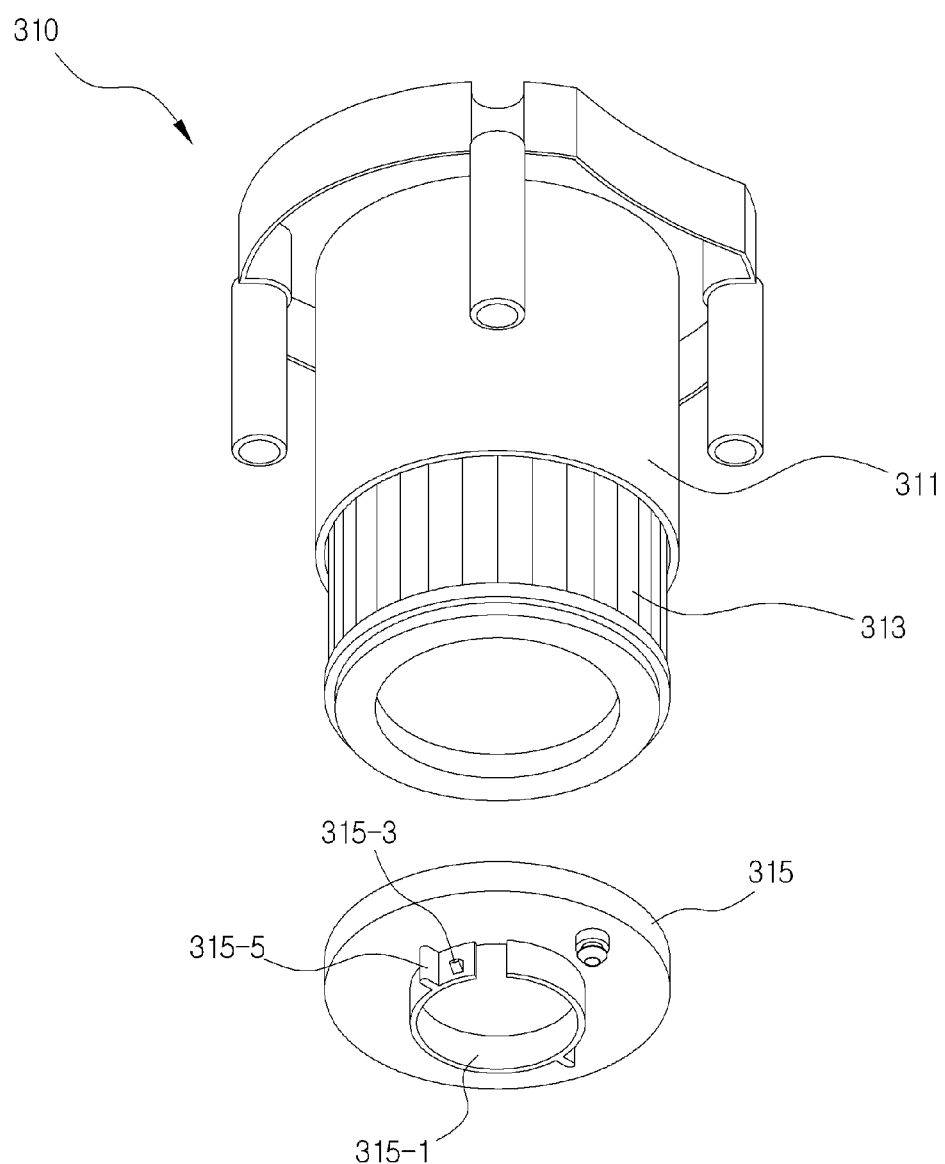
FIG. 2 is an exploded perspective view of the intank filter assembly of FIG. 1.
Figure 3:
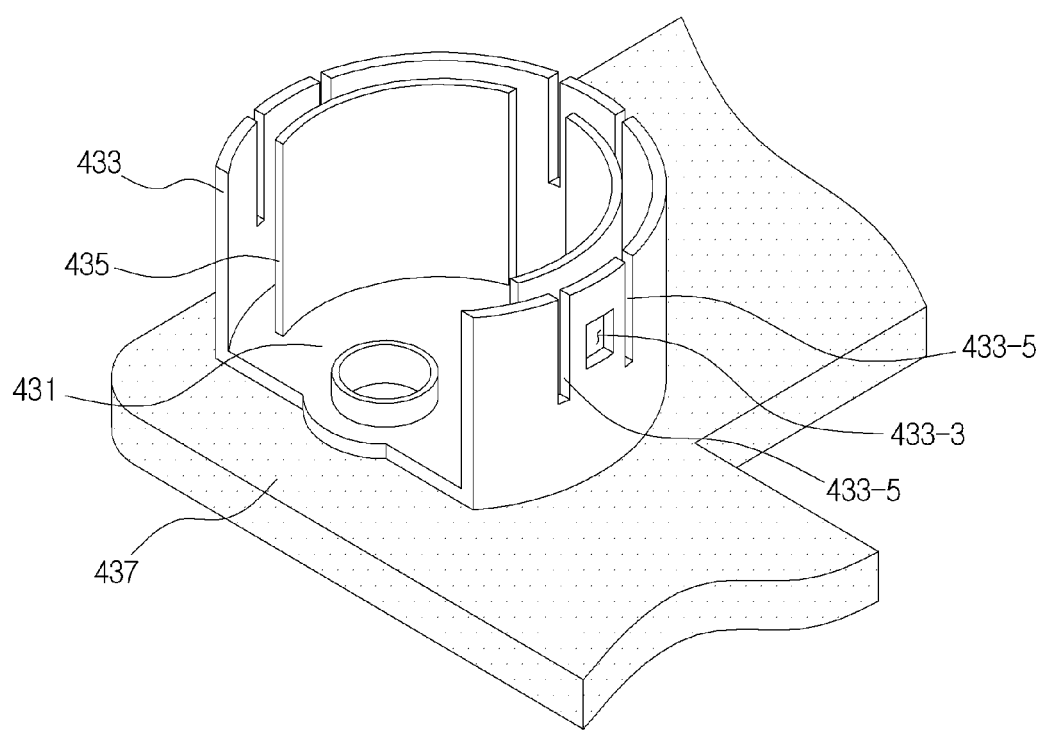
FIG. 3 is a perspective view of the primary filter assembly of FIG. 1.

FIG. 1 is an exploded perspective view of a fuel pump module according to an exemplary embodiment of the present invention; FIG. 2 is an exploded perspective view of the intank filter assembly of FIG. 1; and FIG. 3 is a perspective view of the primary filter assembly of FIG. 1.

Referring to FIG. 1, the fuel pump module according to the exemplary embodiment of the present invention includes a flange 110 mounted in a fuel tank (not shown) to thereby have an upper surface exposed to the fuel tank (not shown) and a lower surface positioned in the fuel tank (not shown).

Referring to FIG. 1, the flange 110 includes a supply port 120 formed on an upper surface thereof in order to supply fuel to an engine.

Referring to FIG. 1, an upper end of a support bar 150 is connected to a lower end of the flange 110. The support bar 150 is formed to be extended downwardly.

Referring to FIG. 1, the flange 110 includes a reservoir 210 positioned thereunder, wherein the reservoir 210 is installed in the fuel tank (not shown). The reservoir 210 is connected and fixed to the lower end of the support bar 150.

Referring to FIG. 1, the reservoir 210 includes an intank filter assembly 310 installed therein, wherein the intank filter assembly 310 is connected to the support bar 150.

Referring to FIG. 1, the intank filter assembly 310 includes a fuel pump 410 embedded therein. The fuel pump 410, which is a component of the fuel pump module, transports the fuel in the fuel tank (not shown) to the engine when electricity is applied thereto. The fuel pump 410 to which the electricity is applied generates harmonic vibration acceleration at a predetermined period according to revolution per minute (RPM). The harmonic vibration acceleration generally generates noise of the fuel pump module. Particularly, when the harmonic vibration acceleration is positioned at a unique vibration of the fuel pump module or the fuel pump, abnormal vibration and noise are generated.

Referring to FIG. 1, the intank filter assembly 310 includes a primary filter assembly 430 coupled to a lower end thereof, wherein the primary filter assembly 430 is installed in the reservoir 210.

Referring to FIG. 2, the intank filter assembly 310 includes an intank filter upper housing 311, an intank filter 313, and an intank filter lower housing 315. The intank filter 313 is a filter for protecting the engine from polluted fuel.

Referring to FIG. 2, the intank filter upper housing 311 is provided with a support bar guiding pipe (omission of a reference numeral) into which the support bar 150 is inserted to be guided. The intank filter 313 is installed in the intank filter upper housing 311 while having a cylindrical shape. The fuel pump 410 has a circumferential surface enclosed by the intank filter 313 and is installed in the intank filter upper housing 311. The intank filter lower housing 315 includes a fuel introduction hole (omission of a reference numeral) formed at a central portion thereof in order to introduce the fuel and an intank filter fixing part 315-1 formed to be protruded downwardly while being close to the fuel introduction hole (not shown). The intank filter lower housing 315 is coupled to a lower end of the intank filter upper housing 311 to thereby support the intank filter 313 and the fuel pump 410.

Referring to FIG. 3, the primary filter assembly 430 includes a primary filter fixing part body 431, a first primary filter fixing part 433, a second primary filter fixing part 435, and a primary filter 437. The primary filter 437 is a filter for protecting the fuel pump in the fuel pump module from the polluted fuel.

Referring to FIG. 3, the first primary filter fixing part 433 is formed to be protruded upwardly along an edge of the primary filter fixing part body 431 so as to be coupled to the intank filter fixing part 315-1 while having an inner side contacting an outer side of the intank filter fixing part 315-1. The second primary filter fixing part 435 is formed to be protruded upwardly from the primary filter fixing part body 431 in a state in which it is spaced apart from the first primary filter fixing part 433 so as to be coupled to the intank filter fixing part 315-1 while having an outer side contacting an inner side of the intank filter fixing part 315-1. The primary filter 437 is coupled to the primary filter fixing part body 431.

A height of the second primary filter fixing part 435 is changed to increase mass of the fuel pump module, such that harmonic vibration of the fuel pump 410 is positioned at a unique vibration area of the fuel pump module, thereby making it possible to remove noise generated in the fuel tank (not shown) due to abnormal vibration of the fuel pump module.

In addition, the second primary filter fixing part 435 firmly contacts the intank filter fixing part 315-1, thereby preventing vibration of the fuel pump module. That is, the second primary filter fixing part 435 firmly contacts the intank filter fixing part 315-1, such that a clearance between the primary filter assembly 430 and the intank filter assembly 310 is reduced, thereby preventing the vibration of the fuel pump module.

Referring to FIG. 2, the intank filter fixing part 315-1 includes a coupling protrusion 315-3 formed to be protruded on a circumferential surface thereof. In addition, the intank filter fixing part 315-1 may include guide protrusions 315-5 formed to be protruded on the circumferential surface thereof, wherein the guide protrusions 315-5 are spaced apart from the coupling protrusion 315-3 and have a linear shape in a vertical direction.

Referring to FIG. 3, the first primary filter fixing part 433 includes a coupling groove 433-3 formed therein, wherein the coupling groove 433-3 has the coupling protrusion 315-3 inserted thereinto. In addition, the first primary filter fixing part 433 includes coupling auxiliary grooves 433-5 formed at both sides of the coupling groove 433-3, wherein the coupling auxiliary grooves 433-5 are spaced apart from the coupling groove 433-3 and have a linear shape in the vertical direction. Due to the coupling auxiliary groove 433-5, a portion of the first primary filter fixing part 433 at which the coupling groove 433-3 is formed is easily widened in a radial direction, such that the coupling protrusion 315-3 and the coupling groove 433-3 are easily coupled to each other. Meanwhile, the guide protrusions 315-5 are inserted into the coupling auxiliary grooves 433-5.

According to the exemplary embodiment of the present invention, the fuel pump of the fuel pump module, which is a vibration body, is physically coupled to the intank filter, the primary filter, and the like, which are other components of the fuel pump module, to have increased mass, such that harmonic vibration of the fuel pump is positioned in the unique vibration area of the fuel pump module, thereby making it possible to remove noise generated in the fuel tank due to abnormal vibration of the fuel pump module.

In addition, according to the exemplary embodiment of the present invention, the second primary filter fixing part, which is an assembly combined with the fuel pump, firmly contacts the intank filter fixing part, thereby making it possible to prevent vibration of the fuel pump module.

What is claimed is:

1. A fuel pump module for damping vibration comprising:
a flange having an upper surface exposed to the outside and connected to a fuel tank;
a support bar having an upper end connected to a lower end of the flange and extended downwardly;
a reservoir connected and fixed to a lower end of the support bar;
an intank filter assembly connected to the support bar and installed in the reservoir;
a fuel pump embedded in the intank filter assembly; and
a primary filter assembly coupled to a lower end of the intank filter assembly and installed in the reservoir,
wherein the intank filter assembly includes an intank filter upper housing, an intank filter enclosing the fuel pump and installed in the intank filter upper housing, and an intank filter lower housing having a fuel introduction hole formed at a central portion thereof in order to introduce fuel and an intank filter fixing part formed to be protruded downwardly while being close to the fuel introduction hole and coupled to a lower end of the intank filter upper housing to thereby support the intank filter and the fuel pump, and
wherein the primary filter assembly includes a primary filter fixing part body, a first primary filter fixing part protruded upwardly along an edge of the primary filter fixing part body so as to be coupled to the intank filter fixing part while contacting an outer side of the intank filter fixing part, a second primary filter fixing part protruded upwardly from the primary filter fixing part body in a state in which it is spaced apart from the first primary filter fixing part so as to be coupled to the intank filter fixing part while contacting an inner side of the intank filter fixing part, and a primary filter coupled to the primary filter fixing part body.

2. The fuel pump module for damping vibration of claim 1, wherein the intank filter fixing part includes a coupling protrusion formed to be protruded on a circumferential surface thereof, and the first primary filter fixing part includes a coupling groove formed therein, the coupling groove having the coupling protrusion inserted thereinto.

3. The fuel pump module for damping vibration of claim 2, wherein the first primary filter fixing part includes coupling auxiliary grooves formed at both sides of the coupling groove, the coupling auxiliary grooves being spaced apart from the coupling groove and having a linear shape in the vertical direction, and
wherein the intank filter fixing part includes guide protrusions formed to be protruded on the circumferential surface thereof, the guide protrusions having a linear shape in the vertical direction and being inserted into the coupling auxiliary grooves.

* * * * *